Oct. 19, 1954     S. M. WEAVER     2,692,172
BEARING
Filed Nov. 16, 1951
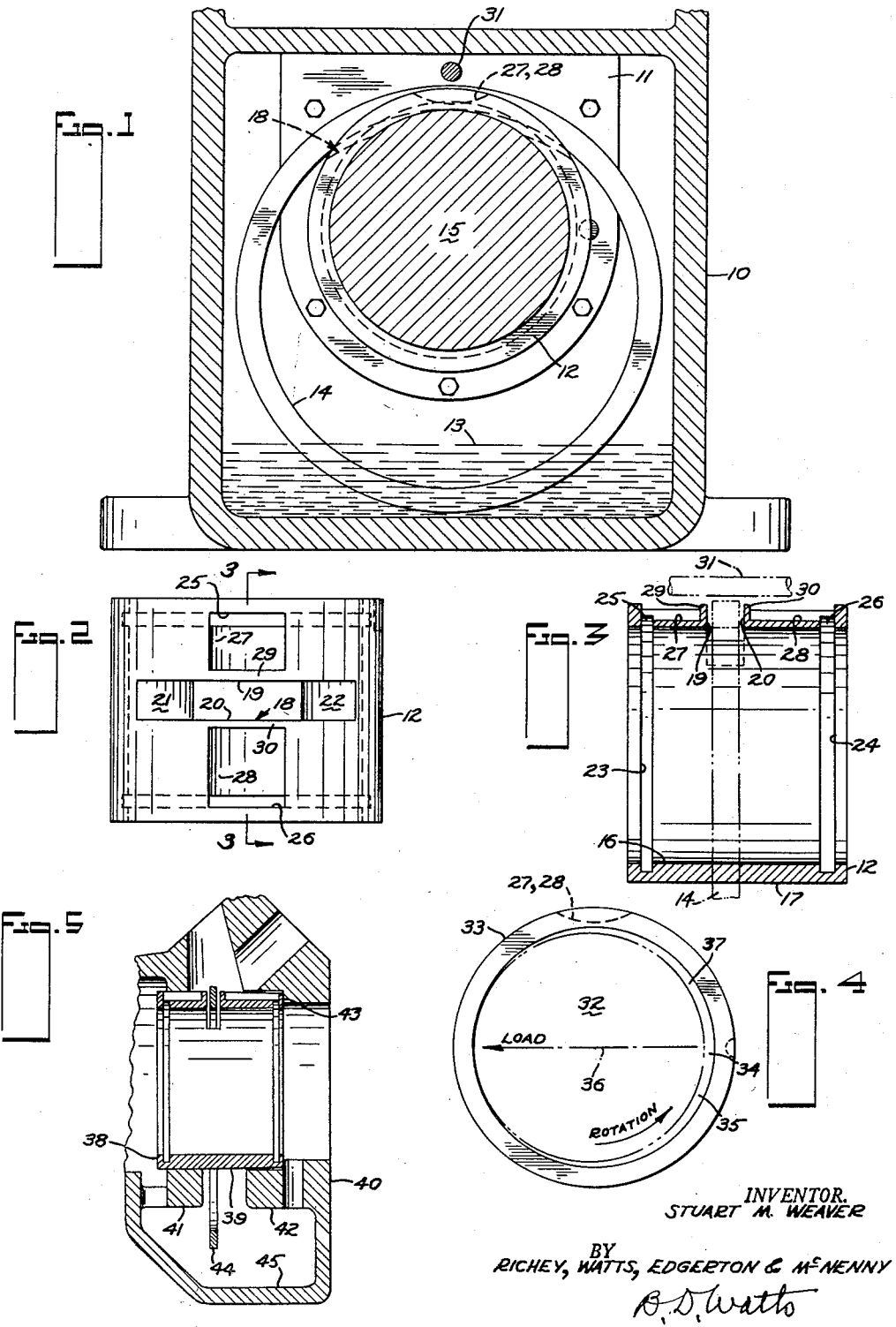
INVENTOR.
STUART M. WEAVER
BY
RICHEY, WATTS, EDGERTON & McNENNY
B. D. Watts
ATTORNEYS Patented Oct. 19, 1954

2,692,172

UNITED STATES PATENT OFFICE 2,692,172

BEARING

Stuart M. Weaver, Mansfield, Ohio, assignor to The Ideal Electric and Manufacturing Company, Mansfield, Ohio, a corporation of Ohio Application November 16, 1951, Serial No. 256,676

11 Claims. (Cl. 308—128)

This invention relates to bearings, and more particularly to a novel sleeve bearing of the type in which a ring is utilized to carry a supply of lubricant to the top of the bearing.

A primary object of this invention is to extend the useful life of sleeve bearings beyond the limits heretofore imposed on the art.

Another important object of this invention is to accomplish better lubrication of sleeve bearings than has ever heretofore been possible.

Another important object of this invention is to accomplish effective lubrication of sleeve bearings independently of the direction of loading or direction of rotation of the journal.

A further object of this invention is to obtain the foregoing objectives without incurring any material economic disadvantages either from the standpoint of manufacture, maintenance, repair or replacement.

It is still another important object of this invention to obtain the foregoing objectives, while maintaining or even increasing the load-carrying capacity of the best sleeve bearings known heretofore in the art.

Still another object of this invention is to provide a sleeve bearing having all the foregoing advantages and also possessing a greater effective bearing ratio than the ring oil bearings of the prior art.

The types of sleeve bearings known as ring-oiled bearings incorporate a slot at the top of the bearing extending through the wall of the sleeve so as to expose the journal of the shaft. An oiling ring passes through the slot and rides upon the journal so that as the shaft rotates, the ring also rotates and carries oil from a reservoir, into which the lower portion of the ring projects, to the shaft. Since the oil must then be distributed from the slot along the length and around the circumference of the bearing, it has been customary to incorporate spiral or longitudinal grooves in the bearing surface and extending circumferentially outward toward the ends of the bearing to provide a path for the flow of the lubricating oil. Such arrangements have certain disadvantages, particularly, that if the groove occurs in the area where the journal is bearing heavily upon the sleeve, the groove bleeds off the oil film pressure in that area; and, that if the direction of rotation of the journal and the direction of belt pull or other load is such as to bring the region of positive pressure gradient to the top half of the bearing where heretofore it has been necessary to introduce oil into the bearing, the positive pressure gradient will prevent the introduction of the lubricant into the grooves.

The present invention is concerned with a new and improved type of ring-oiled sleeve bearing intended and adapted to obviate the above-mentioned difficulties. In accordance with the invention, the lubricant grooves extend circumferentially around the interior of the bearing sleeve at the ends of the sleeve. The lubricant is conveyed from the oil ring carrier to the grooves by depressions formed at the top of the bearing in the external surface of the sleeve. As a result of this arrangement, the lubricant may flow readily to any point on the circumference of the groove; and, since the groove extends completely around the shaft, the direction of rotation or application of load is immaterial. As a further consequence of the complete encircling of the journal, the oil may be drawn into the region between the sleeve and the journal at any point where a pressure reduction is taking place. Finally, also the circumferential length of the ring slot may be considerably reduced as compared with the usual practice, so that a given bearing may carry a relatively greater load inasmuch as oil film pressure bleeding due to the ring slot itself is minimized.

Other objects and advantages, more or less ancillary to the foregoing, and the manner in which all the various objects are realized, will appear in the following description, which, considered in connection with the accompanying drawings, sets forth the preferred embodiment of the invention.

In the drawings:

Fig. 1 is a sectional view showing the general organization of the bearing;

Fig. 2 is a top plan view of the sleeve of the bearing;

Fig. 3 is a vertical sectional view of the sleeve of the bearing taken along the lines 3—3 of Fig. 2;

Fig. 4 is a representation of the relation of the journal to the sleeve of the bearing under load condition; and Fig. 5 is a vertical sectional view of an alternative embodiment and application of the invention.

Referring now to Fig. 1, there is shown an embodiment of the bearing of the invention as incorporated e. g. in the bearing for an electric motor. The bearing is supported from the frame 10 of the motor by means of a hanger 11 into which the sleeve 12 is fitted at the end of the sleeve. Means such as the hanger 11 are, of course, necessary to support the remaining portion or end of the sleeve 12. The frame 10 serves as a container for oil 13 through which an oil ring 14, of usual design, passes. The ring rides upon and is rotated by the shaft 15 of the motor, the shaft being journalled in the sleeve 12.

The structure of the sleeve 12 will be apparent from a consideration of Figs. 2 and 3. The sleeve comprises a generally cylindrical body member having a cylindrical inner surface 16 which is appropriately finished, as is known in the art pertaining to sleeve bearings. The outer surface 17 of the sleeve is formed to cooperate with the particular type of bearing hanger which may be utilized.

A slot designated generally at 18 is formed in the sleeve member and extends transversely of the sleeve, the walls 19 and 20 extending generally in planes perpendicular to the longitudinal axis of the sleeve and spaced so as to accommodate the oiling ring 14. The ends of the slots 21 and 22 are generally arcuate so as to permit the rotation of the ring 14 without requiring an excessive diameter for the ring and to minimize the circumferential length of the ring slot. To this end, the inner ends of the slot extend slightly below the top level of the inner surface of the sleeve while the outer ends of the slot extend still further below the inner ends.

In accordance with the invention, there is formed in the sleeve member, at points adjacent the ends of the member, two circumferentially extending grooves 23 and 24. These grooves are formed in the body of the sleeve and extend radially outward so as to form a groove of depth sufficient to accommodate the flow of oil or similar lubricant without excessive viscosity effects. At the top of the sleeve, the grooves 23 and 24 are formed into openings 25 and 26 which communicate with depressions 27 and 28 formed in the body of the sleeve. These depressions form conduits for the lubricant and extend along the length of the sleeve to a point adjacent the slot 18, where they are terminated by wall portions 29 and 30. The wall portions 29 and 30 serve as baffles which allow oil or lubricant to flow from the oiling ring 14 into the depressions 27 and 28 and thence to the grooves 23 and 24 but prevent the oil from flowing into the slot 18. Under proper circumstances, of course, depending upon the design of the ring and slot, the wall portions 29 and 30 need not be provided or they may be of relatively small extent so as to not conform with the external surface of the sleeve.

In operation, the rotation of the journal of the shaft 15 imparts a rotary motion to the oiling ring 14 which rides upon the journal. The lubricant 13 adheres to the surface of the ring and is carried to the top portion of the sleeve where it flows over the wall portions 29 and 30 into the depressions 27 and 28. Thence, the oil or lubricant flows from the depressions into the circumferential grooves 23 and 24 and is communicated to the surface of the journal of the shaft. The flow of oil from the ring 14 into the depressions 27 and 28 is facilitated by the provision of a ring having a slightly greater radial extent than the wall portions 28 and 29. Also a wiper 31 may be spaced a short distance e. g. 1/16", from the ring to mechanically aid the removal of oil from the outer circumference of the ring. The wiper may comprise any suitable member, as an axially directed rod and supported by the hanger 11.

The manner in which the oil is distributed to the surface of the shaft and bearing, together with the reason for the advantageous results, will be more clearly apparent from a consideration of Fig. 4 in which the operation of the bearing is represented under load conditions. A shaft 32 is shown rotating in a sleeve 33 so as to direct the resultant load in the direction shown by the arrow, that is upon the side wall of the bearing sleeve. Under these conditions and due to the slight eccentricity of the shaft with respect to the sleeve, a pressure gradient is formed in the space 34 between the shaft and the sleeve. In the space 35, below the line of application of the load designated at 36, the gradient will be negative, that is it will be a diminishing pressure so that oil or lubricant will be drawn from the grooves 23 and 24 into that region. In the region 37 above the load application line, the gradient is positive, that is the pressure is increasing and oil will not be drawn into the region. It is a normal aspect of the functioning of the bearing that the oil or lubricant be forced from the bearing due to the positive pressure gradient in the region 36. However, the film which has been communicated to the surface of the shaft in the region 35 will be such that the film will continue into the region 37, thus providing a sufficiently effective lubrication of the surfaces in the load area. If the direction of rotation is reversed, the lubricant will, of course, be drawn into the region 37.

It is a particularly significant feature of the invention as herein embodied that the effective formation of a lubricant film on the surface of the shaft together with the fact that the ring slot 18 may be of relatively small extent greatly enhances the effectiveness of the bearing. This is true since there is a maximum utilization of the internal sleeve area with the result that the ratio of the length of the sleeve to the diameter of the sleeve may be greatly reduced as compared with normal practice. As an example of this advantage, the present bearing has a length-diameter ratio of 1:1 where normal practice requires a ratio of 2 or 3 to 1. The importance of this feature will be particularly apparent from a consideration of the effects of shaft deflection under load conditions, inasmuch as the relatively shorter bearing has a much lesser tendency to cramp due to the load than the longer bearing. This results in the further advantage that the novel bearing is much less liable to burn out than would be customary or expected.

Referring now to Fig. 5, there is shown an alternative embodiment of and application of the conception of the invention in which the effects of cramping and shaft deflection under load are further mitagated. In this embodiment, the sleeve 38 of the bearing is formed in the same fashion as the sleeve 12 of the first embodiment of the invention. The outer surface of the sleeve is, however, formed with a slight taper, that is, the outer surface of the sleeve is a conical surface with the vertex of the apparent cone on the axis of the sleeve. The amount of taper may be very small, e. g., in the order of .002" diameter change per inch of length of the sleeve, as indicated at 39.

As shown in Fig. 5, the sleeve 38 may be supported in a housing 40 having two annular sleeve support portions 41 and 42. The inner diameters of these support portions may be equal and related to the outer diameter of the larger outside diameter of the sleeve 38 so as to provide the necessary support and stability at one end thereof, as e. g. at portion 41. The remaining end of the sleeve will thus be enabled to adjust itself to slight distortions of the supported shaft.

In the illustrated embodiment, the sleeve 38 is retained at the smaller end thereof by a shoulder 43 formed in the body of the housing 40. An oil ring 44 is illustrated in normal operating position. The lower portion of the housing 40 forms an oil reservoir 45.

A further modification of the invention (not illustrated) is similar to the embodiments shown with the exception that a separate ring is provided for supplying each groove with lubricant. In such a modification, a ring slot 18 is positioned immediately adjacent the groove opening which is defined by a slot wall (as e. g. 29 or 30). The lubricant is thus fed directly into the groove opening and the lubricant conducting depressions in the body of the sleeve (as e. g. 27 and 28) are rendered unnecessary. Furthermore, it is intended that a plurality of rings may be utilized to feed a single groove within the spirit of the invention.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A bearing sleeve comprising a body member having an inner bearing surface and an outer surface, a slot in the body extending radially through the member and having a lateral extent sufficient to permit an oil ring positioned in the slot to ride upon a shaft extending through the sleeve, a circumferential groove formed in the inner surface of the body member, the groove extending radially outward from the inner surface of the member, and means formed in the body member for conducting lubricant from a point adjacent the slot to the groove including an opening through the body member to the groove, the groove being closed throughout the remainder of the circumference thereof.

2. A bearing sleeve comprising a body member having an inner bearing surface and an outer surface, a slot in the body extending radially through the member and having a lateral extent sufficient to permit an oil ring positioned in the slot to ride upon a shaft extending through the sleeve, a circumferential groove formed in the inner surface of the body member, the groove extending radially outward from the inner surface of the member, and a conduit formed in the body member including an opening extending through the body member between the groove and the conduit for conducting lubricant from the slot to the groove, the groove being closed throughout the remainder of the circumference thereof, and a wall across the conduit adjacent the slot to prevent return of fluid to the slot.

3. A bearing sleeve comprising a body member having a cylindrical inner bearing surface, and an outer surface, a transverse slot extending radially through the member and having sufficient circumferential extent to permit an oil ring positioned in the groove to ride upon a shaft extending through the sleeve, a circumferential groove formed in the inner surface of the body member adjacent an end of the member, the groove extending radially outward from the inner surface of the member, and a depression formed in the upper portion of the member extending radially inward from the outer surface of the member, but not through the member, the said depression extending from a point adjacent the slot to the groove and an opening through the body member from the depression to the groove for carrying a lubricant from the ring to the groove.

4. A bearing sleeve comprising a body member having a cylindrical inner bearing surface, and an outer surface, a transverse slot in the body extending radially between the inner surface and the outer surface, a circumferential groove formed in the body member adjacent an end of the member, the groove extending radially outward from the inner surface of the member, a depression formed in the member radially inward from the outer surface of the member and positioned adjacent the slot and communicating with the circumferential groove for carrying a lubricant to the groove, and a radially extending wall portion disposed between the slot and the adjacent end of the depression serving as a terminus for the depression.

5. A bearing sleeve comprising a body member having a cylindrical inner bearing surface, and an outer surface, a transverse slot in the body extending radially through the member and forming an arc eccentric with respect to the inner bearing surface, a circumferential groove formed in the body member adjacent an end of the member, the groove extending radially outward from the inner surface of the member and continuously around the member, and a depression formed in the member radially inward from the outer surface of the member and positioned adjacent the slot and an opening communicating with the circumferential groove for carrying a lubricant to the grooves, the slot and the opening being the sole means of fluid communication between the outside and the inside of the member.

6. The combination with a shaft of a bearing sleeve comprising a generally cylindrical member having an inner cylindrical surface forming a bearing surface and an outer surface, a transverse slot extending radially between the inner and outer surfaces, the slot serving to expose a portion of the shaft, a circumferential groove extending into the body of the member from the inner surface, conduit means communicating with the groove for delivering oil from the slot to the groove the groove being closed throughout the remainder of the circumference thereof, an oil reservoir, and an oil ring substantially larger in diameter than the bearing member riding on the shaft in the slot and dipping into the reservoir whereby oil is delivered from the reservoir into the circumferential grooves.

7. The combination with a shaft of a bearing sleeve comprising a generally cylindrical member having an inner cylindrical surface forming a bearing surface, an outer surface, a transverse slot extending radially between the inner and outer surfaces, the slot serving to expose only a sufficient portion of the shaft to support an oil ring, circumferential grooves extending into the body of the member from the inner surface and adjacent the ends of the member, conduit means for delivering oil from the slot to the grooves, an oil reservoir, and an oil ring substantially larger in diameter than the bearing member riding on the shaft in the slot and dipping into the reservoir whereby oil is delivered from the reservoir into the circumferential grooves, the said conduit means comprising a depression in the upper portion of the member and an opening from the depression into the groove, the groove being closed through the remainder of the circumference thereof to confine the flow of oil.

8. The combination with a shaft of a bearing sleeve comprising a generally cylindrical member having an inner cylindrical surface forming a bearing surface, an outer surface, a transverse slot extending radially between the inner and outer surfaces, and extending transversely to a level below the tangent plane of the inner surface, the slot serving to expose a portion of the shaft, circumferential grooves extending into the body of the member from the inner surface and adjacent the ends of the member, depressions formed in the member radially inward from the outer surface of the member and positioned adjacent the slot and communicating with the grooves, an oil reservoir, an oil ring substantially larger in diameter than the bearing member riding on the shaft in the slot and dipping into the reservoir whereby lubricant is delivered from the reservoir into the depressions and grooves, and radially extending wall portions disposed between the slot and the adjacent end of the depression serving as a baffle to prevent the return of lubricant into the slot.

9. The combination with a shaft of a bearing sleeve comprising a generally cylindrical member having an inner cylindrical surface forming a bearing surface and a tapered outer surface, the sleeve normally bearing upon a support at the larger diameter end thereof and deflecting for normal engagement of the sleeve with the support under load, a transverse slot extending radially between the inner and outer surfaces, the slot serving to expose a portion of the shaft, a circumferential groove extending into the body of the member from the inner surface and adjacent an end of the member, conduit means communicating with the groove for delivering oil from the slot to the groove, an oil reservoir, and an oil ring substantially larger in diameter than the bearing member riding on the shaft in the slot and dipping into the reservoir whereby oil is delivered from the reservoir into the circumferential grooves.

10. The combination of a shaft, a bearing sleeve comprising a generally cylindrical member having two ends, an inner cylindrical surface forming a bearing surface and an outer surface having one end thereof of a lesser diameter than the remaining end, a transverse slot extending radially between the inner and outer surfaces, the slot serving to expose a portion of the shaft, circumferential grooves extending into the body of the member from the inner surface and adjacent the ends of the member, conduit means for delivering oil from the slot to the groove, the said conduit means comprising depressions formed in the member extending radially inward from the outer surface of the member but not through the member and positioned adjacent the slot and an opening communicating with the grooves, and radially extending wall portions across the depressions adjacent the slot to prevent return of oil to the slot, an oil reservoir, and an oil ring substantially larger in diameter than the bearing member riding on the shaft in the slot and dipping into the reservoir, whereby oil is delivered from the reservoir into the circumferential grooves, and support means for the bearing sleeve comprising a member having an opening for receiving the sleeve, the opening being adapted to engage and support the larger diameter outer surface of the sleeve while allowing a slight deflection of the sleeve at the smaller outer diameter end thereof.

11. The invention in accordance with claim 10, the opening of the support member at the smaller end being of a greater diameter than that of the corresponding end of the sleeve member.

References Cited in the file of this patent

UNITED STATES PATENTS

| Number | Name | Date |
|---|---|---|
| 559,956 | Stilwell | May 12, 1896 |
| 1,099,218 | Van Norman | June 9, 1914 |
| 1,304,730 | Bentley | May 27, 1919 |
| 1,683,608 | Daun | Sept. 11, 1928 |
| 1,674,453 | Sloper | June 19, 1928 |

FOREIGN PATENTS

| Number | Country | Date |
|---|---|---|
| 19,555 | Great Britain | 1913 |